Patented June 17, 1952

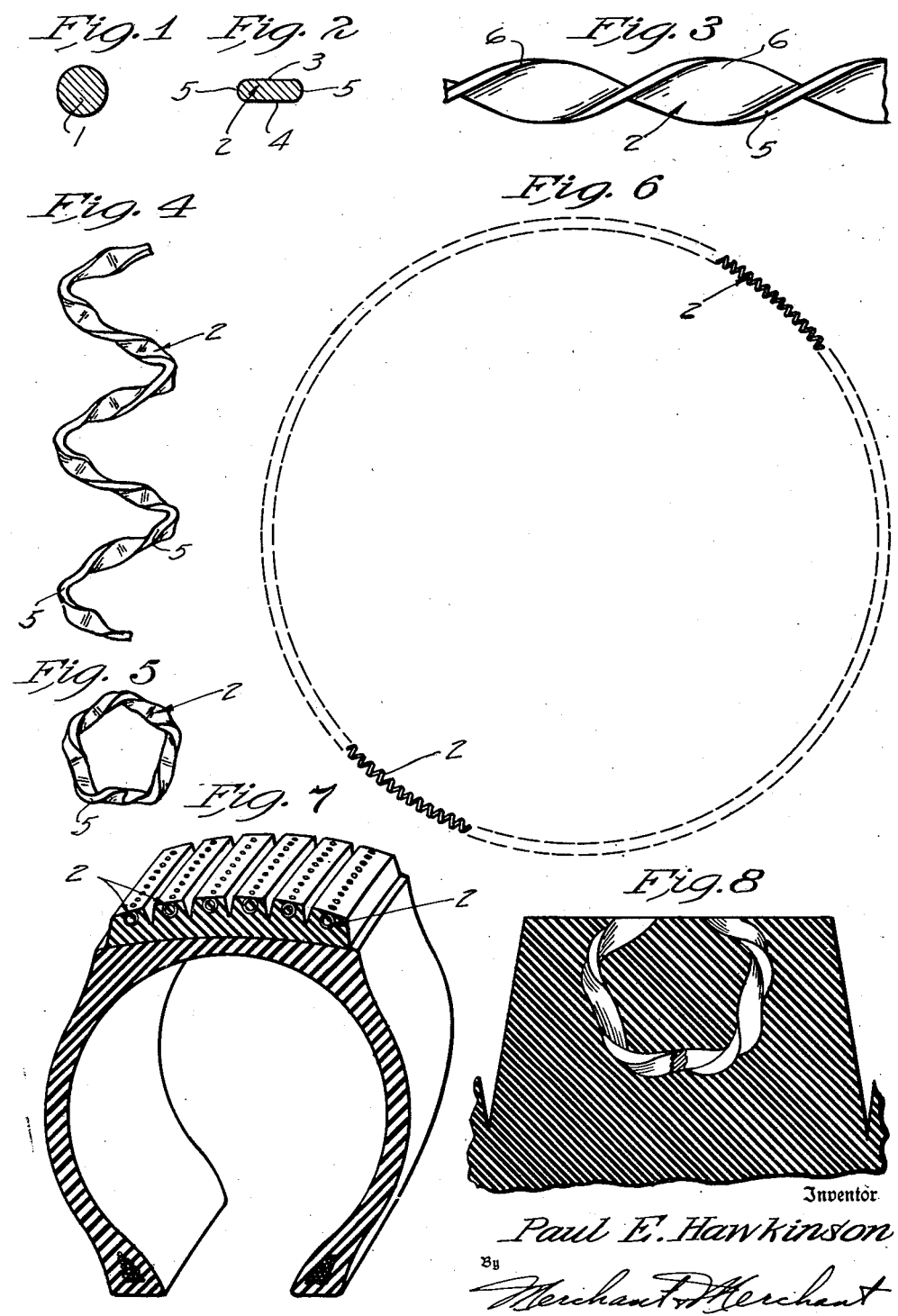

2,600,534

UNITED STATES PATENT OFFICE 2,600,534

METHOD OF MAKING COILED WIRE FOR USE IN ANTISKID PNEUMATIC TIRE TREADS

Paul E. Hawkinson, Minneapolis, Minn., assignor to Paul E. Hawkinson Company, Minneapolis, Minn., a corporation of Minnesota Application October 6, 1950, Serial No. 188,721

2 Claims. (Cl. 29—148)

My invention relates to the method of making anti-skid treads for pneumatic tires and, more particularly, to such treads having incorporated therein a plurality of generally U-shaped metallic gripping claws.

It is a common practice to insert the U-shaped metallic gripping claws into the treads of pneumatic tries initially in the form of endless wire coils and thereafter, either by artificial means or wear, abrading away sufficient of the radially outwardly-disposed portion of the coils to provide a large number of disconnected outwardly-opening U-shaped gripping claws. However, has been found that these disconnected gripping claws become readily dislodged from the tread unless they are provided with anchoring means intermediate the exposed ends. Thus, United States Patent No. 1,159,244 suggests twisting a cross-sectionally square wire to provide continuous anchoring flanges. However, I have found that the anchoring flanges or treads so formed are not sufficiently deep to satisfactorily anchor the gripping claws.

The object of my invention is to provide a method of making wire coils which, when formed into disconnected gripping claws, will be provided with an adequate anchoring means.

A further object of my invention is the provision of the novel method of forming a coil of wire which will produce U-shaped anchoring claws when the radially outermost portion of each convolution is abraded away by natural or artificial wear.

A still further object of my invention is the provision of a tread having adequately anchored gripping claws, which tread may be produced at a minimum of cost and which is extremely efficient in operation.

The above and still further objects of my invention will become apparent from the following detailed specification, appended claims, and attached drawings.

Referring to the drawings, wherein like characters indicate like parts throughout the several views:

Fig. 1 is a view in cross section of a length of wire suitable for use in the practicing of my invention;

Fig. 2 is a view corresponding to Fig. 1, but illustrating a further step in my novel method;

Fig. 3 is a fragmentary view in side elevation of the structure of Fig. 2, illustrating a still further step of my novel method;

Fig. 4 is a fragmentary view on a reduced scale in side elevation, illustrating a still further step of my novel method;

Fig. 5 is a view in end elevation of the structure of Fig. 4;

Fig. 6 is a diagrammatical view in side elevation of the wire shown in Figs. 4 and 5 formed in a circular coil preparatory to placing the same within a tire tread; and Fig. 7 is a fragmentary perspective view showing a conventional tire tread with a plurality of wire coils, of the type shown in Fig. 6, imbedded in the tread thereof.

Fig. 8 is a substantially enlarged transverse sectional view of a portion of the tire tread shown in Fig. 7 and illustrating in particular the transverse configuration of the coil subsequent to the removal of the outer portion thereof to provide circumferentially spaced, generally U-shaped road gripping claws.

Referring with greater particularity to the drawings, the numeral 1 indicates a length of conventional wire initially formed, as shown in Fig. 1, with a circular cross section. As shown in Fig. 2, the first step in my novel method comprises flattening of the wire of Fig. 1 such as by running the same through suitable rollers whereby to produce a relatively flat strip 2 having substantially parallel upper and lower surfaces 3 and 4 respectively and convex edges 5.

The next step in my novel method comprises twisting the relatively flat strip 2 of Fig. 2 to provide the open helical strip shown in Fig. 3. This helical strip is next spirally wound, as indicated in Fig. 4, in the form of an endless coil spring.

Endless coils of the helical strip, as in Fig. 4, are inserted into the treads of pneumatic tires by any suitable method, preferably in the manner illustrated in my United States Patent Re. 23,235.

It has been found that the improved coils herein disclosed, when imbedded in the tread rubber material of tires to provide spaced generally U-shaped gripping claws, i. e. after the outer portions of the tread and outer portions of the coil convolutions have been removed, are endowed with highly efficient tread material anchoring portions which positively retain the claws throughout their lengths in their operative positions in the tread and hence retaining the road gripping effect thereof throughout the entire wearing-down period of the tread.

This improved and highly efficient gripping and anchoring action of the claws throughout their lengths with the rubber of the tread is effected by the smooth helical ridges provided by the relatively wide twisted helical strip 2, as can be readily visualized upon inspection of the enlargement shown in Fig. 8. Furthermore, in the coiling of this helical strip the convolutions of the coil are not circular in transverse section of the coil. This is due to a variable resistance to bending of the open helical strip structure in the step of coiling wherein successive longitudinally spaced portions thereof are caused to bend on a shorter radius than the intervening portions. The coil thus produced and viewed in transverse section, is in fact generally polygonal rather than circular, as is also clearly indicated in Figs. 5 and 8. Through such added shape of the convolutions of the coils the retention of the resulting gripping claws in the tread material is further greatly increased.

What I claim is:

1. The method of forming metallic coils for use in rubber tires treads and which upon removal of the radial outer portions of the convolutions thereof when imbedded in a tire tread provide individual generally U-shaped claw members having road engaging ends; which comprises the successive steps of subjecting a length of round wire to flattening pressures from opposite sides thereof to provide a relatively wide strip having opposed flat sides and opposed convex edges and with substantial wear resisting hardness imparted to the material thereof, twisting the elongated strip about its central longitudinal axis to provide a helical strip, and thereafter winding the helical strip into the form of a coil.

2. The method of forming metallic coils for use in rubber tire treads and which upon removal of the radial outer portions of the convolutions thereof when imbedded in a tire tread provide individual generally U-shaped claw members having road engaging ends, which comprises the successive steps of subjecting a length of round wire to flattening pressures from opposite sides thereof to provide a relatively wide strip having opposed flat sides and opposed convex edges and with substantial wear resisting hardness imparted to the material thereof, twisting the elongated strip about its central longitudinal axis to provide an open helical strip structure, and thereafter winding the helical strip structure into the form of a coil in which successive longitudinally spaced portions thereof are bent on a shorter radius than the intervening portions, whereby to provide a coil the convolutions of which are of generally polygonal form when viewed axially of the coil.

PAUL E. HAWKINSON.

REFERENCES CITED

The following references are of record in the file of this patent:

UNITED STATES PATENTS

| Number | Name | Date |
| --- | --- | --- |
| 145,285 | Dudley | Dec. 9, 1873 |
| 1,542,385 | Harris | June 16, 1925 |
| 1,876,953 | Johnson | Sept. 13, 1932 |
| 1,910,020 | Boutillier et al. | May 23, 1933 |
| 2,036,034 | Fulmer et al. | Mar. 31, 1936 |
| 2,260,779 | Hoffman | Oct. 28, 1941 |
| 2,287,879 | Hennessy | June 30, 1942 |
| 2,365,959 | Horwedel | Dec. 26, 1944 |
| 2,457,132 | Delaney | Dec. 28, 1948 |